United States Patent [19]
Miyao et al.

[11] 3,884,095
[45] May 20, 1975

[54] DAMPER MECHANISM FOR HYDROSTATIC TRANSMISSION

[75] Inventors: Takayuki Miyao; Hiroaki Maeda, both of Toyota; Masanori Sato, Nagoya, all of Japan

[73] Assignee: Aisin Seiki Kabushiki Kaisha, Toyota, Japan

[22] Filed: July 17, 1973

[21] Appl. No.: 379,947

[30] Foreign Application Priority Data
July 31, 1972 Japan............................. 47-76738

[52] U.S. Cl. ..................... 74/687; 138/31; 138/30; 92/60; 91/390
[51] Int. Cl. ... F16h 47/04; F16l 55/04; F15b 13/16
[58] Field of Search ....... 74/687; 138/30, 31; 92/60, 92/143; 91/390

[56] References Cited
UNITED STATES PATENTS

| | | | |
|---|---|---|---|
| 1,959,889 | 5/1934 | Wunsch | 138/30 X |
| 2,353,304 | 7/1944 | Green | 92/60 |
| 2,809,666 | 10/1957 | Judd | 138/31 |
| 3,085,796 | 4/1963 | Wettstein | 138/31 X |
| 3,241,464 | 3/1966 | Pierce, Jr. | 92/60 |
| 3,348,579 | 10/1967 | Swift et al. | 138/31 |
| 3,385,169 | 5/1968 | Hale et al. | 138/30 X |
| 3,648,570 | 3/1972 | Koch | 92/60 |

FOREIGN PATENTS OR APPLICATIONS

| | | | |
|---|---|---|---|
| 1,062,253 | 12/1962 | United Kingdom | 74/687 |

*Primary Examiner*—Samuel Scott
*Assistant Examiner*—P. S. Lall
*Attorney, Agent, or Firm*—Pierce, Scheffler & Parker

[57] ABSTRACT

A hydrostatic transmission comprising an input shaft, an output shaft, a differential gear set, two pump-motors hydraulically connected to each other by a pair of hydraulic circuits, and being selectively associated with the input shaft, the output shaft and the differential gear set, and a hydraulic damper mechanism arranged between the pair of hydraulic circuits.

7 Claims, 8 Drawing Figures

DAMPER MECHANISM FOR HYDROSTATIC TRANSMISSION

BACKGROUND OF THE INVENTION

This invention relates generally to hydrostatic transmissions and more particularly to hydrostatic transmissions providing a plurality of speed range drives.

In order to effect a wide speed range, conventionally, various hydrostatic transmissions having a plurality of speed range drives have been proposed. In time of changes of the plurality of speed range drives, however, the high and low relation between the hydraulic pressures within two hydraulic pump-motor circuits will be reversed. Therefore, the hydraulic pressures within the circuits will be raised and lowered suddenly and remarkably and, thus, the vibrations of the hydraulic pressures will be occured within the circuits. This results in that the hydrostatic transmission will be shocked.

In addition, the changes of the plurality of speed range drives mean the shift between a purely hyrostatic drive and a combined hydrostatic and mechanical differential drive, the shift between input and output split power drives in the combined hydrostatic and mechanical differential drive, the shift of the reference speed ratios in the combined hydrostatic and mechanical differential drive and the like.

SUMMARY OF THE INVENTION

Therefore, it is an object of the present invention to provide an improved hydrostatic transmission for obviating the abovementioned drawbacks.

It is another object of the present invention to provide an improved hydrostatic transmission wherein a hydraulic damper mechanism is provided between the hydraulic pump-motor circuits by which a pair of pump-motors are connected to each other.

BRIEF DESCRIPTION OF THE DRAWINGS

Various other objects, features and appendant advantages of the present invention will be more fully appreciated as the same become better understood from the following detailed description when considered in connection with the accompanying drawings in which like reference charactors designate like or corresponding parts throughout the several figures, and wherein.

DETAILED DESCRIPTION OF THE PREFERRED EMBODIMENTS

Figure 1:
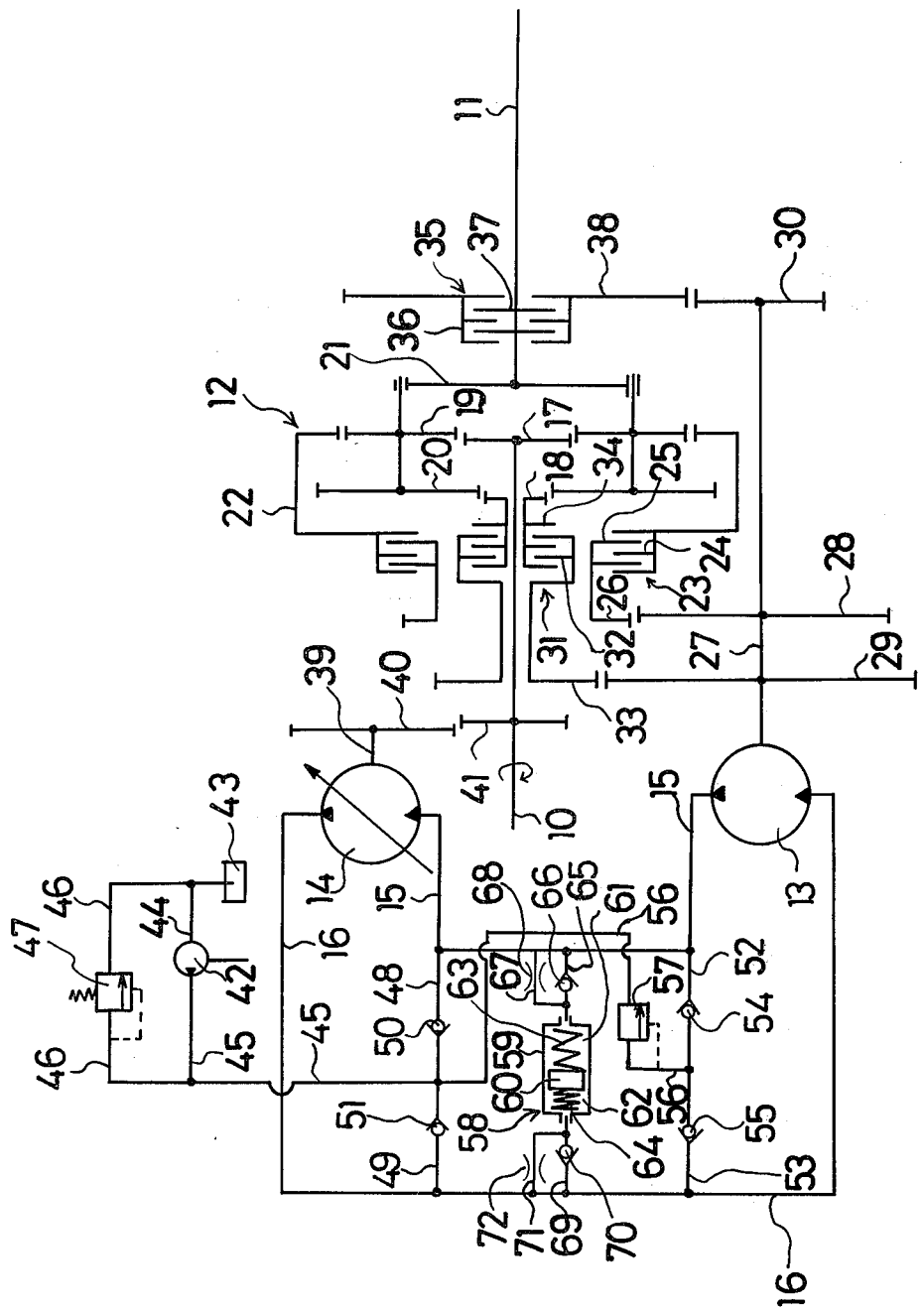
FIG. 1 is a systematical view showing one embodiment of the present invention.

Referring now to the drawings, and more particularly to FIG. 1 thereof, a hydrostatic transmission comprises an input rotary shaft 10 mechanically connected to a prime mover, not shown, an output rotary shaft 11 coaxially arranged with the input shaft 10, a differential gear set 12 interposed between the shafts 10 and 11, and hydrostatic pump-motors 13 and 14 hydraulically connected to each other through a pair of hydraulic circuits 15 and 16. The hydrostatic pump-motors 13 and 14 are respectively of a convential axial piston type. The swash plate of the hydrostatic pump-motor 13 is inclined in one direction and is fixed, so that the displacement of the hydrostatic pump-motor 13 is fixed. While the hydrostatic pump-motor 14 has variable displacement in response to the position of the variable swash plate thereof.

The differential gear set 12 includes a first sun gear 17 secured on the input shaft 10, a second sun gear 18 arranged coaxially with the first sun gear 17, first and second planetary gears 19 and 20 coaxially arranged and fixed to each other and meshed with the first and second sun gears 17 and 18, respectively, a carrier 21 which rotatably carries the both planetary gears 19 and 20, the carrier 21 being secured to the output shaft 11, and a ring gear 22 meshed with the first planetary gear 19. The ring gear 22 may be meshed with the second planetary gear 20.

A first clutch 23 has first and second portions 24 and 25 which are fixed to the ring gear 22 and a gear 26, respectively.

A rotary shaft 27 of the hydrostatic pump-motor 13 has three gears 28, 29 and 30 thereon, the gear 28 being meshed with the gear 26. The gear 29 associates with a first portion 32 of a second clutch 31 through a gear 33. A second portion 34 of the second clutch 31 is fixed to the second sun gear 18.

A third clutch 35 includes first and second portions 36 and 37 which are fixed to a gear 38 and the output shaft 11, respectively. The gear 38 meshes with the gear 30. A rotary shaft 39 of the hydrostatic pump-motor 14 is mechanically connected to the input shaft 10 through gears 40 and 41.

A hydraulic charging pump 42 driven by the prime mover is connected to a reservoir 43 via a suction conduit 44 to deliver the hydraulic pressure to a delivery conduit 45. A return conduit 46 forms a return line between the conduit 45 and the reservoir 43. Disposed within the return conduit 46 is a relief valve 47 which acts so as to maintain the delivery pressure from the pump 42 into a predetermined pressure (about 10 kg/cm$^2$). The delivery conduit 45 hydraulically connects to the circuits 15 and 16 through conduits 48 and 49 in which check valves 50 and 51 disposed, respectively. The check valves 50 and 51 will permit the hydraulic flows from the conduit 45 to the circuits 15 and 16. Therefore, when the hydraulic leakages will be occured at the hydrostatic pump-motors 13 and 14, the compensation hydraulic fluid will be transmitted from the conduit 45 to the circuits 15 and 16 via the check valves 50 and 51.

The hydraulic circuits 15 and 16 are further connected to the conduit 45 through conduits 52, 53 and 56. Disposed, respectively, within the conduits 52 and 53 are check valves 54 and 55 which permit the hydraulic flows from the circuits 15 and 16 to the conduit 56. A relief valve 57 is disposed within the conduit 56 and is changed over into its communicating position when the hydraulic pressures within the circuits 15 and 16 will be raised extraordinarily. Thus, the extraordinary high pressure within the circuits 15 and 16 will be relieved to prevent the troubles of the circuits 15 and 16 and the hydrostatic pump-motors 13 and 14.

The numeral 58 denotes a hydraulic damper mechanism according to the present invention. The damper mechanism 58 comprises a housing or cylinder 59, and a piston 60 slidably mounted within the cylinder 59 to thereby define first and second chambers 61 and 62 within the cylinder 59. The piston 60 is biased leftwardly by a biasing force of a spring 63, and is biased rightwardly by a biasing force of a spring 64. The first chamber 61 is in communication with the circuit 15 via a conduit 65 in which a check valve 66 is disposed, and via a conduit 67 including an orifice 68. While the second chamber 62 is in communication with the circuit 16 via a conduit 69 including a check valve 70 therein, and via a conduit 71 including an orifice 72. The check valve 66 will permit the hydraulic flow from the circuit 15 to the chamber 61 and the check valve 70 will permit the hydraulic flow from the circuit 16 to the chamber 62.

In the hydrostatic transmission having the above-mentioned structure, the maximum value of the displacement $D_2$ of the hydrostatic pump-motor 14 will be settled the same as the displacement $D_1$ of the hydrostatic pump-motor 13. In case that the ring gear 22 meshes with the planetary gear 19, the relating parts will be settled as follows: A ratio of a distance $R$ to a distance $r_1$ is 2.0 where $R$ is a distance between axes of the sun gears 17 and 18 and the planetary gears 19 and 20 and $r_1$ is a radius of pitch circle of the planetary gear 19. A ratio of a distance $r_2$ to the distance $r_1$ is 1.5 where $r_2$ is a radius of pitch circle of the planetary gear 20. A gear ratio of the gear 26 to the gear 28 is 0.875, a gear ratio of the gear 33 to the gear 29 is 0.478 and a gear ratio of the gear 41 to the gear 40 is 0.650.

Figure 2:
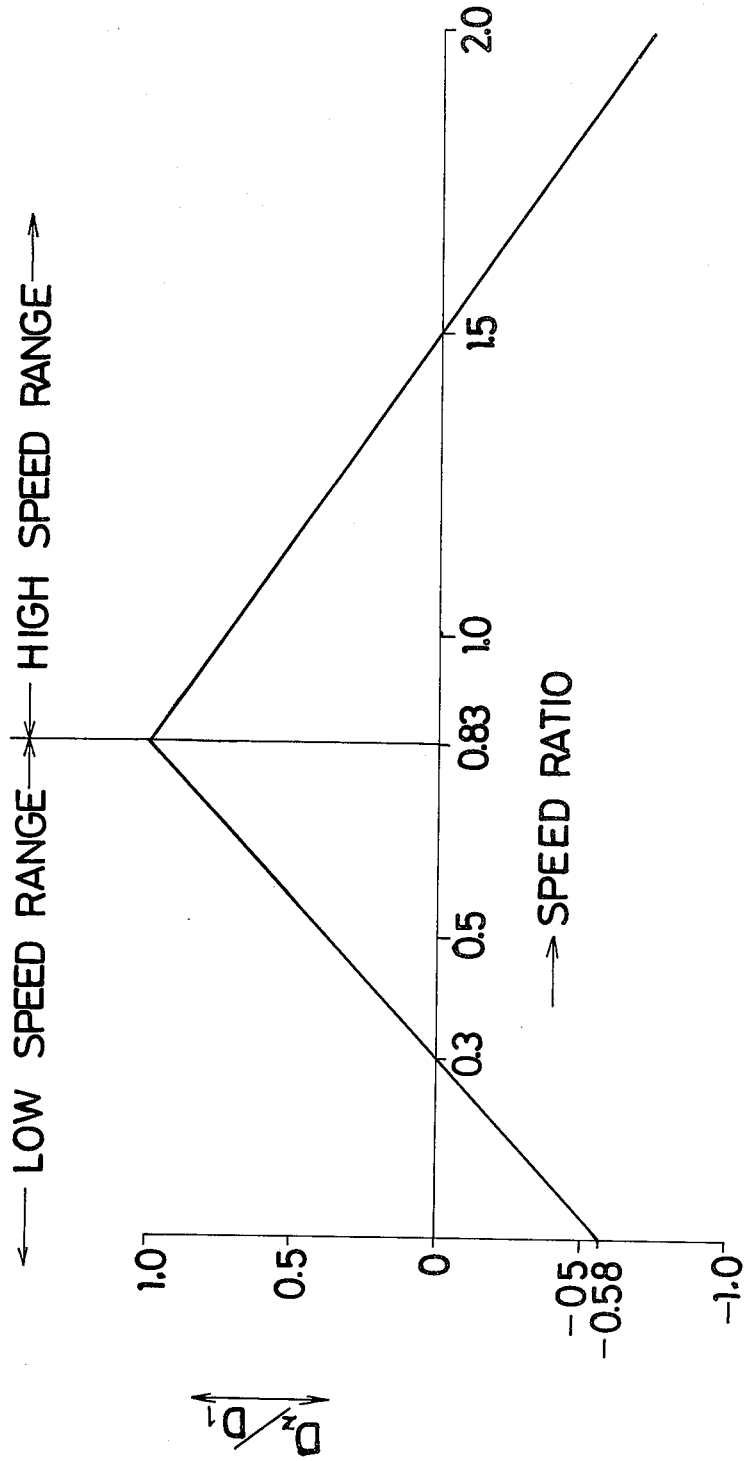
FIGS. 2 and 3 are graphs illustrating certain operating characteristics of the hydrostatic transmission of FIG. 1.
Figure 3:
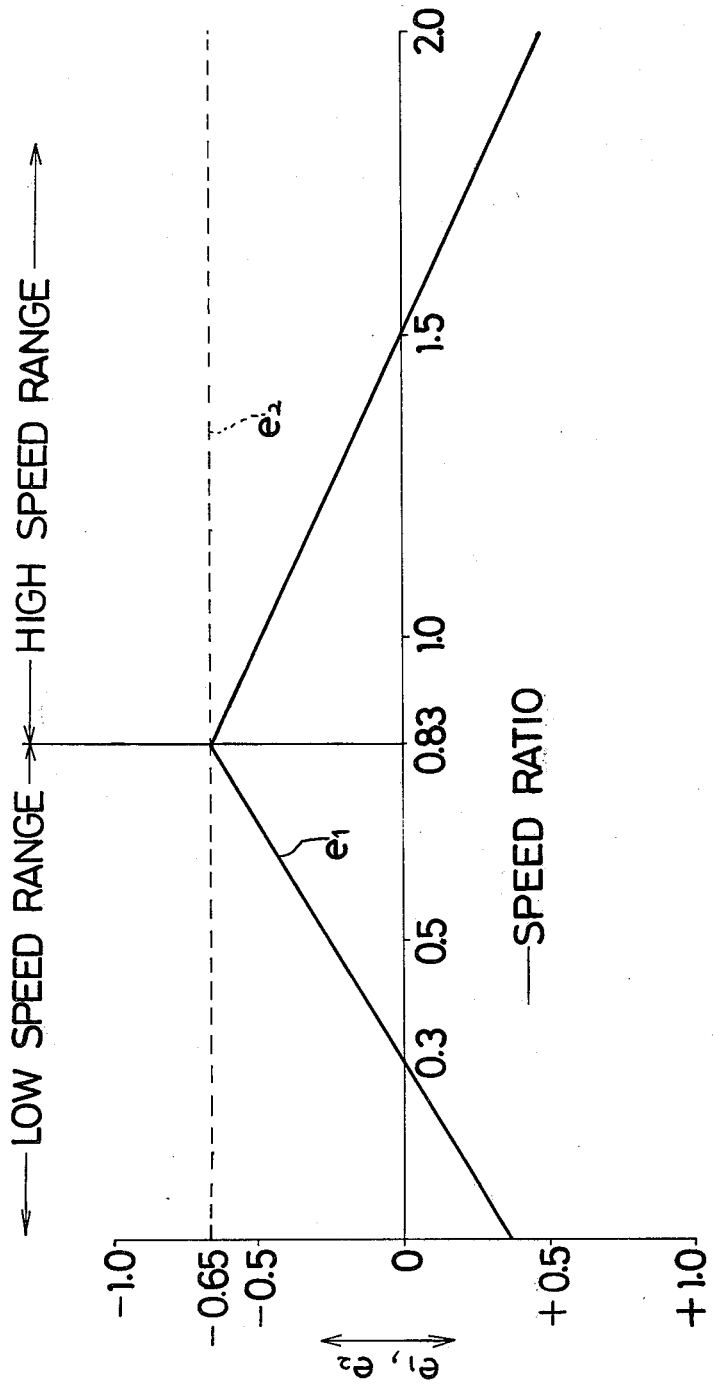

The hydrostatic transmission will be in a low speed range when the clutch 23 is engaged, and will be in a high speed range when the clutch 31 is engaged. FIG. 2 shows a displacement ratio $D_2/D_1$ - speed ratio characteristics of the hydrostatic transmission where the displacement ratio $D_2/D_1$ is a ratio of the displacement $D_2$ of the pump-motor 14 to the displacement $D_1$ of the pump-motor 13, and the speed ratio is a ratio of the rotational speed of the output shaft 11 to the rotational speed of the input shaft 10. FIG. 3 shows a characteristics between a ratio $e_1$ of the rotational speed of the pump-motor 13 to the rotational speed of the input shaft 10 and the speed ratio, and between a ratio $e_2$ of the rotational speed of the pump-motor 14 to the rotational speed of the input shaft 10 and the speed ratio.

In operation, the input shaft 10 will be rotated by the prime mover in a direction of arrow in FIG. 1. When the speed ratio is zero and the clutch 23 is engaged, the swash plate of the pump-motor 14 is inclined in one direction in which the hydraulic flow direction within the circuits 15 and 16, when the pump-motor 14 and the input shaft 10 are rotated to each other in the opposite direction, coincides with the hydraulic flow direction within the circuits 15 and 16 when the pump-motor 13 and the input shaft 10 are rotated in the same direction. The displacement ratio $D_2/D_1$ is −0.58, as shown in FIG. 2. Signs + and − in FIG. 2 may be considered as the inclination direction of the swash plate. Under the circumstances, the rate of the rotational speed of the pump-motor 13 to the rotational speed of the input shaft 10 is about 0.37 and the rate of the rotational speed of the pump-motor 14 to the rotational speed of the input shaft 10 is about 0.65.

Now, the inclination degree of the swash plate of the pump-motor 14 will be gradually decreased toward zero and, thus, the displacement ratio $D_2/D_1$ will be also decreased toward zero. Therefore, the ratio $e_1$ of the rotational speed of the pump-motor 13 to the rotational speed of the input shaft 10 will approach zero, and the input and output shafts 10 and 11 will be rotated to each other in the same direction. Thus the speed ratio will be increased. In addition, the pump-motor 14 associates with the input shaft 10 through gears 40 and 41 so that the rate $e_2$ of the rotational speed of the pump-motor 14 to the rotational speed of the input shaft 10 is constant. When the inclination degree of the swash plate of the pump-motor 14 is zero, the rate $e_1$ of the rotational speed of the pump-motor 13 to the rotational speed of the input shaft 10 will become zero, whereby the rotation of the pump-motor 13 is stopped and the speed ratio will become 0.3. This speed ratio 0.3 is a reference speed ratio during the clutch 23 is engaged. At the speed ratio 0.3, all the input power is transmitted from the input shaft 10 to the output shaft 11 through the sun gear 17, the planetary gear 19 and the carrier 21.

When the speed ratio is less than 0.3, the pump-motor 13 acts as a pump and the pump-motor 14 acts as a motor in the conventional manner, and the hydraulic pressure within the circuit 15 will be high. A part of the input power is transmitted from the input shaft 10 to the output shaft 11 through said transmitting line and the remaining part of the input power is transmitted from the input shaft 10 to the output shaft 11 through the sun gear 17, the ring gear 22, the clutch 23, gears 26 and 28, the pump-motor 13, the pump-motor 14, the gears 40 and 41, the input shaft 10, the sun gear 17, the planetary gear 19 and the carrier 21.

After the inclination degree of the swash plate of the pump-motor 14 reaches zero, the swash plate of the pump-motor 14 will be inclined in the opposite direction and the inclination degree of the swash plate will be increased. Accordingly, the displacement ratio $D_2/D_1$ will be increased, the pump-motor 13 will be now rotated in the opposite direction with respect to the rotational direction of the input shaft 10, and the ratio $e_1$ of the rotational speed of the pump-motor 13 to the rotational speed of the input shaft 10 will be increased. Thus, the speed ratio will be increased. Therefore, a part of the input power is now transmitted from the input shaft 10 to the output shaft 11 through the sun gear 17, the planetary gear 19 and the carrier 21 and the remaining part of the input power is now transmitted from the input shaft 10 to the output shaft 11 through gears 41 and 40, the pump-motor 14, the pump-motor 13, gears 28 and 26, the clutch 23, the ring gear 22, the planetary gear 19 and the carrier 21. At this time, the pump-motor 14 acts as a pump and the pump-motor 13 acts as a motor. But the rotational direction of the pump-motor 13 is now reversed so that the hydraulic pressure within the circuit 15 will still be high.

During the engagement of the clutch 23, when the swash plate of the pump-motor 14 is inclined to its maximum in said opposite direction, so that the displacement ratio $D_2/D_1$ is 1.0, the speed ratio will be 0.83 and portions 32 and 34 of the second clutch 31 will synchronize to each other, and the ratio $e_1$ of the rotational speed of the pump-motor 13 to the rotational speed of the input shaft 10 is −0.65.

When the speed ratio is 0.83, the second clutch 31 is engaged and then the first clutch 23 is disengaged. The inclination degree of the swash plate of the pump-motor 14 will be then decreased, so that the displacement ratio $D_2/D_1$ will be decreased. Thus, the ratio $e_1$ of the rotational speed of the pump-motor 13 to the rotational speed of the input shaft 10 will be changed toward zero, whereby the speed ratio will be further increased.

During the engagement of the clutch 31, when the inclination degree of the swash plate of the pump-motor 14 will be gradually decreased and, then, it will be zero, the ratio $e_1$ of the rotational speed of the pump-motor 13 to the rotational speed of the input shaft 10 will be zero. Thus, the rotation of the pump-motor 13 is stopped in which the speed ratio is 1.5. This speed ratio 1.5 is a reference speed ratio in the high speed range. At the speed ratio 1.5, all the power is transmitted from the input shaft 10 to the output shaft 11 through the sun gear 17, the planetary gear 19 and the carrier 21.

When the speed ratio is less than 1.5, the pump-motor 13 acts as a pump and the pump-motor 14 acts as a motor. But, since the rotational direction of the pump-motor 13 does not change, the hydraulic pressure within the circuit 16 will be now high. The part of the power is transmitted from the input shaft 10 to the output shaft 11 through said transmitting line and the remaining power is transmitted from the input shaft 10 to the output shaft 11 through the sun gear 17, the planetary gears 19 and 20, the sun gear 18, the clutch 31, gears 33 and 29, the pump-motor 13, the pump-motor 14, gears 40 and 41, the input shaft 10, the sun gear 17, the planetary gear 19 and the carrier 21.

During the engagement of the clutch 31, after the inclination degree of the swash plate of the pump-motor 14 reaches zero, the swash plate of the pump-motor 14 will be inclined reversely with respect to the hitherto inclination direction of the swash plate. The inclination degree of the swash plate of the pump-motor 14 will be gradually increased and, thus, the displacement ratio $D_2/D_1$ will be increased toword the negative sense. Accordingly, the pump-motor 13 and the input shaft 10 will be rotated into the same direction and the rate $e_1$ of the rotational speed of the pump-motor 13 to the rotational speed of the input shaft 10 will be increased. This results in the increase of the speed ratio. At this time, the pump-motor 14 acts as a pump and the pump-motor 13 acts as a motor. But, since the rotational direction of the pump-motor 13 is reversed, the hydraulic pressure within the circuit 16 will be still high. The part of the power is now transmitted from the input shaft 10 to the output shaft 11 through the sun gear 17, the planetary gear 19 and the carrier 21, and the remaining power is transmitted from the input shaft 10 to the output shaft 11 through gears 41 and 40, the pump-motor 14, the pump-motor 13, the gears 29 and 33, the clutch 31, the sun gear 18, the planetary gears 20 and 19 and the carrier 21.

When the displacement ratio $D_2/D_1$ will be about $-0.74$, the speed ratio will be 2.0.

In the above-mentioned cases, the output shaft 11 is rotated in the same direction with respect to the rotational direction of the input shaft 10. When it is required that the output shaft 11 is rotated reversely with respect to the rotational direction of the input shaft 10, the first and second clutches 23 and 31 are disengaged while the third clutch 35 is engaged. Therefore, all the power is now transmitted from the input shaft 10 to the output shaft 11 through the gears 41 and 40, the pump-motor 14, the pump-motor 13, the gears 30 and 38 and the clutch 35. In that case, when the swash plate of the pump-motor 14 is inclined into a direction, as illustrated in FIG. 1, the pump-motor 14 and the input shaft 10 are rotated to each other in the same direction, and thus the output shaft 11 is now rotated reversely with respect to the rotational direction of the input shaft 10. With the change of the displacement of the pump-motor 14, the rotational speed of the pump-motor 13 is changed correspondingly, whereby the rotational speed of the output shaft 11 is also changed. In addition, the input and output shafts 10 and 11 may be rotated to each other in the same direction when the swash plate of the pump-motor 14 will be inclined in the other direction.

As will be clear hereinbefore, the hydraulic pressure within the circuit 15 will become high when the clutch 23 is engaged while the hydraulic pressure within the circuit 16 will become high when the clutch 31 is engaged. These clutches 23 and 31 are generally changed over within a short time in the conventional manner in which, for example, the change-over operations of the clutches depend on the hydraulic change-over mechanism, not shown, which, in turn, associates with the variable swash plate of the pump-motor. Therefore, the hydraulic pressures within the circuits 15 and 16 will be changed suddenly and remarkably. This causes the vibrations of the hydraulic pressures within the circuits 15 and 16, especially at the high pressure side thereof, so that the system will be shocked. However, these disadvantages will be obviated by the damper mechanism 58 according to the present invention. If the hydraulic pressure within the circuit 15 will become high and the hydraulic pressure within become circuit 16 will be low, the high pressure within the circuit 15 is conveyed to the chamber 61 via the conduit 65 having the check valve 66. Therefore, the piston 60 is moved leftwardly by the conveyed high pressure within the chamber 61. By the leftward movement of the piston 60, the hydraulic fluid within the chamber 62 is transmitted into the circuit 16 via the conduit 71 having the orifice 72. This prevents the sudden change of the hydraulic pressure within the circuit 15. At the same time, it will be prevented that the hydraulic pressure within the circuit 16 will become the negative pressure.

When the hydraulic pressure within the circuit 16 will become high and the hydraulic pressure within the circuit 15 will become low, the hydraulic high pressure within the circuit 16 is transmitted into the chamber 62 via the conduit 69 having the check valve 70 to cause the piston 60 to move in the right direction. Thus, the hydraulic fluid within the chamber 61 is now transmitted into the circuit 15 via the conduit 67 having the orifice 68. Accordingly, the sudden rise or change of hydraulic pressure within the circuit 16 will be prevented, and it will be also prevented that the hydraulic pressure within the circuit 15 will become the negative pressure.

Figure 4:
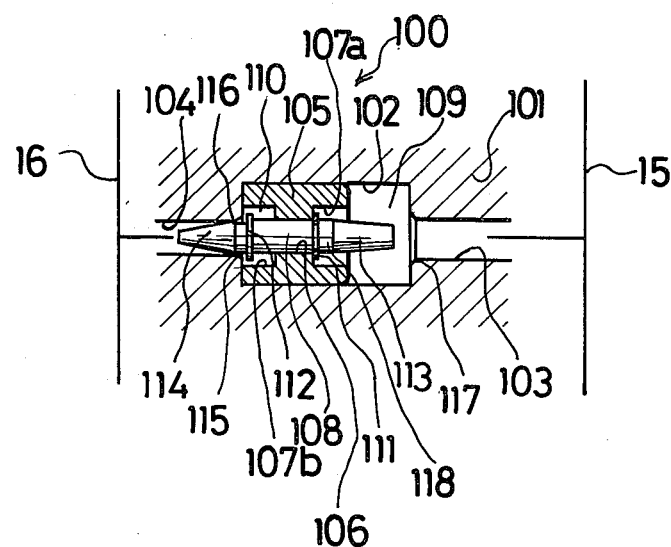
FIG. 4 is a sectional view showing a modification of a hydraulic damper mechanism according to the present invention.

Referring now to FIG. 4 wherein a modified embodiment is illustrated, the numeral 100 denotes a damper mechanism. A housing 101 is provided with a large cylinder 102 and small cylinders 103 and 104. Slidably disposed within the large cylinder 102 is a first piston 105 which has a bore 106 and bores 107a and 107b. A second piston 108 is slidably mounted within the bore 106. Thus, hydraulic chambers 109 and 110 which are connected to the circuits 15 and 16, respectively, are formed within the cylinder 102 by the first and second pistons 105 and 108. The second piston 108 is formed with stoppers 111 and 112 which are in contact with shoulders of the piston 105, respectively, so that the axial movement of the second piston 108 is limitted. The second piston 108 has, at both end thereof, tapering portions 113 and 114 which are slidable in the cylinders 103 and 104, respectively. The second piston 108 also has shoulders 116 and 118 which are in contact with seats 115 and 117 of the housing 101.

FIG. 4 shows a condition in which the hydraulic pressure within the circuit 15 is high and the hydraulic pressure within the circuit 16 is low. By the hydraulic pressure within the chamber 109, the piston 105 is urged in an illustrated and extreme left position, and the piston 108 is urged in an illustrated position in which the stopper 111 is contacted with the piston 105.

Assuming that the hydraulic pressure within the circuit 16 will become high while the hydraulic pressure within the circuit 15 will become low, the piston 108 is firstly moved rightwardly by the high pressure within the cylinder 104 untill the stopper 112 of the piston 108 come in contact with the piston 105. Thereafter, both pistons 105 and 108 will be moved rightwardly as a unit. The hydraulic fluid within the chamber 109 is transmitted into the circuit 15. In that case, with the rightward movement of the piston 108, the hydraulic communication between the chamber 109 and the cylinder 103 will be reduced because the tapering portion 113 of the piston 108 will act as a gradual decreasing orifice with respect to the seat 117 of the housing 101. When the shoulder 118 of the piston 108 is contacted with the seat 117, the hydraulic communication between the chamber 109 and the cylinder 103 is interrupted. Thus both pistons 105 and 108 will be stopped smoothly. Namely, the effective volume of the chamber 110 will be increased gradually and, thus, the sudden rise of the hydraulic pressure within the circuit 16 will be prevented.

When the hydraulic pressure within the circuit 15 will become high, both pistons 105 and 108 will be moved leftwardly, so that the effective damper operation will be attained. This operation will be substantially the same as previously described relative to the case of the hydraulic high pressure within the circuit 16 and, therefore, the detailed explanation will be omitted.

Referring now to FIGS. 5 to 8, hydrostatic transmissions of various types are illustrated. Like numerals designate like parts. Namely, the damper mechanisms according to the present invention may be appliable to these various hydrostatic transmissions.

Figure 5:
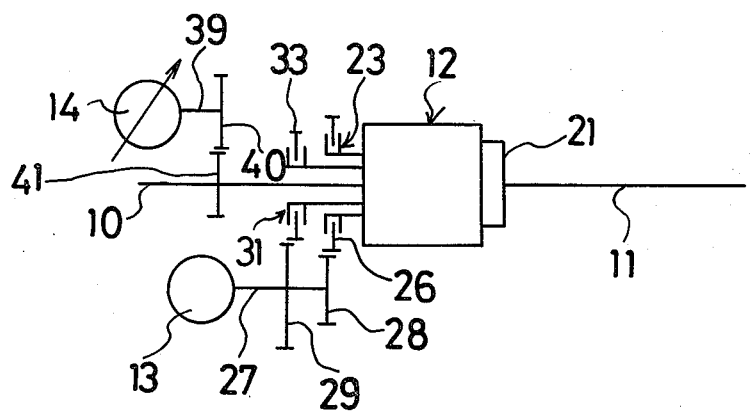

If only the differential gear set 12, as shown in FIG. 1, has four degrees of freedom, the reverse drive mechanism may be ommitted. This is shown in FIG. 5.

Figure 6:
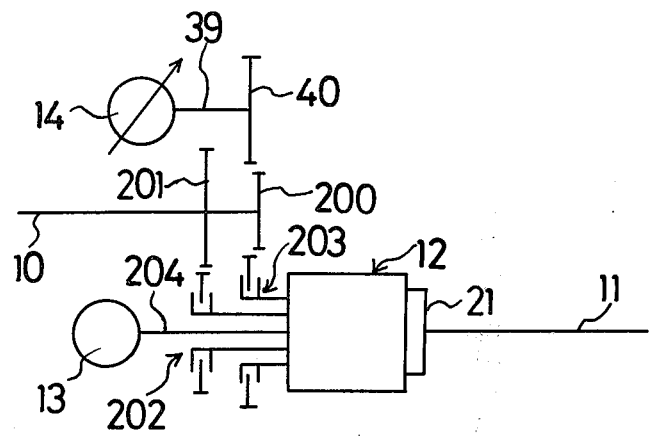

The input shaft 10, the output shaft 11 and the pump-motor 13 may be connected to parts which are different from the parts of the system, as shown in FIG. 1. In FIG. 6, for example, gears 200 and 201 secured on the input shaft 10 are associated with first and second clutches 202 and 203, respectively, the gear 200 being also engaged with the gear 40. A rotary shaft 204 of the pump-motor 13 associates with the differential gear set 12.

Figure 7:
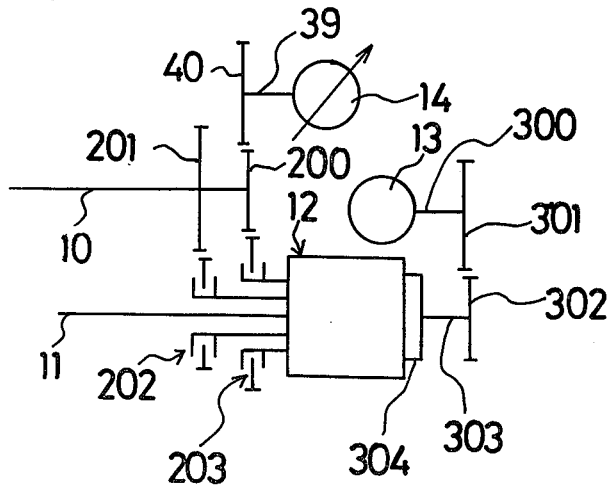

In FIG. 7, a rotary shaft 300 of the pump-motor 13 associates with a carrier 304 of the differential gear set 12 through gears 301 and 302 and the shaft 303.

As known in this art, the system of FIG. 1 will be appropriate for a front engine and rear drive system, and the system of FIG. 7 will be appropriate for a front engine and front drive system or a rear engine and rear drive system.

Referring to reference numerals of FIG. 5, the combination between the input shaft, the output shaft and the pump-motor may be considered six type including types of FIGS. 5, 6 and 7, as shown in the following table.

Table

| Type | Input Shaft | Output Shaft | Pump-Motor |
|------|-------------|--------------|------------|
| 1 | shaft 10 | shaft 11 | shaft 27 |
| 2 | shaft 10 | shaft 27 | shaft 11 |
| 3 | shaft 11 | shaft 10 | shaft 27 |
| 4 | shaft 11 | shaft 27 | shaft 10 |
| 5 | shaft 27 | shaft 10 | shaft 11 |
| 6 | shaft 27 | shaft 11 | shaft 10 |

Figure 8:
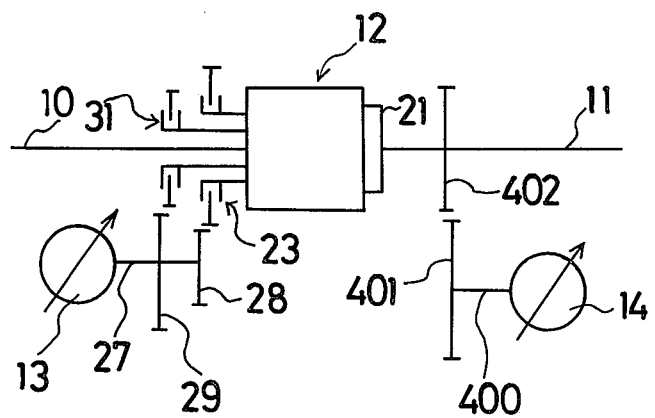
FIGS. 5, 6, 7 and 8 are systematical views of hydrostatic transmissions to which damper mechanisms according to the present invention are applicable.

All hydrostatic transmissions having structures mentioned above operate as the conventional output split-type hydrostatic transmission. In the above table, if the pump-motor 14 is connected to the output shaft, the transmissions operate as the conventional input split-type hydrostatic transmission. This is shown in FIG. 8 wherein a rotary shaft 400 of the pump-motor 14 is connected to the output shaft 11 through gears 401 and 402.

Various other modifications and variations of the present invention are obviously possible in light of the above teachings. It is to be understood therefore, that within the scope of the appended claims, the invention may be practiced otherwise than as specifically described herein.

What is claimed is:

1. In a hydrostatic transmission comprising an input shaft, an output shaft, a differential gear set between said shafts, and two pump-motors hydraulically connected to each other by first and second hydraulic circuits, said pump-motors being adapted for selectively associating with said input shaft, said output shaft and said differential gear set to provide a plurality of speed range drives, the improvement comprising a damper mechanism arranged between said first and second hydraulic circuits for interrupting hydraulic communication therebetween and for absorbing any vibrations of hydraulic pressure when a sudden change of hydraulic pressure occurs in at least one of said first and second circuits.

2. A damper mechanism as set forth in claim 1, comprising a passage for establishing the hydraulic communication between said circuits, a housing positioned in said passage, a piston slidably mounted within said housing to provide first and second chambers therein, said first chamber being connected to said first circuit and said second chamber being connected to said second circuit.

3. A damper mechanism as set forth in claim 2, wherein said first chamber is connected to said first circuit through two conduits, one of said conduits having a check valve therein and the other having an orifice therein, and said second chamber are connected to said second circuit through two conduits, one of said last-mentioned two conduits having a check valve therein and the other having an orifice therein.

4. A damper mechanism as set forth in claim 2, wherein said piston is biased by two spring means.

5. A damper mechanism as set forth in claim 1, comprising a passage for establishing the hydraulic communication between said circuits, a housing positioned in said passage, a first piston slidably mounted within said housing and having a bore, and a second piston slidably mounted within said bore of said first piston, said second piston comprising portions cooperating with corresponding parts of said housing for controlling said hydraulic communication.

6. A damper mechanism as set forth in claim 5, wherein said portions of said second piston have tapering ends.

7. A damper mechanism as set forth in claim 6, wherein said portions of said second piston have shoulders which are in contact with seats of said corresponding parts of said housing.

* * * * *